United States Patent
Toliyat et al.

(10) Patent No.: US 12,273,016 B2
(45) Date of Patent: Apr. 8, 2025

(54) HIGH TORQUE DENSITY ELECTRIC MACHINE WITH DIRECTLY COOLED END WINDINGS

(71) Applicant: The Texas A&M University System, College Station, TX (US)

(72) Inventors: Hamid A. Toliyat, College Station, TX (US); Matthew C. Gardner, Dallas, TX (US); Patrick J. Shamberger, College Station, TX (US); Moble Benedict, College Station, TX (US); Jaime C. Grunlan, College Station, TX (US); Dion S. Antao, College Station, TX (US); Bryan P. Rasmussen, College Station, TX (US); Jonathan R. Felts, College Station, TX (US); Prasad N. Enjeti, College Station, TX (US)

(73) Assignee: The Texas A&M University System, College Station, TX (US)

( * ) Notice: Subject to any disclaimer, the term of this patent is extended or adjusted under 35 U.S.C. 154(b) by 220 days.

(21) Appl. No.: 17/924,598

(22) PCT Filed: May 13, 2021

(86) PCT No.: PCT/US2021/032304
§ 371 (c)(1),
(2) Date: Nov. 10, 2022

(87) PCT Pub. No.: WO2021/231766
PCT Pub. Date: Nov. 18, 2021

(65) Prior Publication Data
US 2023/0179066 A1 Jun. 8, 2023

Related U.S. Application Data

(60) Provisional application No. 63/024,652, filed on May 14, 2020.

(51) Int. Cl.
H02K 9/20 (2006.01)
H02K 9/19 (2006.01)
(Continued)

(52) U.S. Cl.
CPC ............... *H02K 9/225* (2021.01); *H02K 9/19* (2013.01); *H02K 9/20* (2013.01); *H02K 9/22* (2013.01);
(Continued)

(58) Field of Classification Search
CPC .......... H02K 9/19; H02K 9/193; H02K 9/197; H02K 5/20; H02K 5/203; H02K 9/20;
(Continued)

(56) References Cited

U.S. PATENT DOCUMENTS 3,042,888 A    7/1962 Park
3,043,969 A *  7/1962 Petersen ................ H02K 9/223
                                                              310/260
(Continued)

*Primary Examiner* — Alexander A Singh
(74) *Attorney, Agent, or Firm* — Winstead PC

(57) ABSTRACT

An electric machine includes a stator having a plurality of stator teeth. Each stator tooth of the plurality of stator teeth includes a winding disposed there around. Each stator tooth of the plurality of stator teeth is shaped to receive a plurality of microchannels. The microchannels contain a circulating heat-transfer fluid; Each stator tooth of the plurality of stator teeth is thermally exposed to the heat-transfer fluid via the plurality of microchannels so as to effectuate heat removal from each stator tooth of the plurality of stator teeth.

13 Claims, 7 Drawing Sheets

(51) Int. Cl.
  *H02K 9/22* (2006.01)
  *H02K 21/24* (2006.01)
  *H01F 27/24* (2006.01)
  *H01F 27/28* (2006.01)

(52) U.S. Cl.
  CPC ............ *H02K 9/227* (2021.01); *H02K 21/24* (2013.01); *H01F 27/24* (2013.01); *H01F 27/2876* (2013.01)

(58) Field of Classification Search
  CPC .......... H02K 9/22; H02K 9/223; H02K 9/225; H02K 9/227; H02K 21/24; H02K 3/24; H02K 1/20; H02K 5/18; H02K 9/00; H02K 9/02; H02K 9/04; H02K 9/06; H02K 9/08; H02K 9/10; H02K 9/12; H02K 9/14; H02K 9/16; H02K 9/18; H01F 27/24; H01F 27/2876
  USPC ..... 310/52, 53, 54, 55, 57, 58, 59, 60 R, 61, 310/62, 63, 60 A, 64
  See application file for complete search history.

(56) References Cited

U.S. PATENT DOCUMENTS

| | | | |
|---|---|---|---|
| 2006/0026820 A1* | 2/2006 | Rippel | H02K 1/20 336/122 |
| 2012/0242176 A1* | 9/2012 | Pal | H02K 1/20 310/43 |
| 2013/0187492 A1 | 7/2013 | Woolmer | |
| 2013/0200746 A1 | 8/2013 | Foulsham et al. | |
| 2014/0265666 A1 | 9/2014 | Shoykhet et al. | |
| 2015/0001971 A1 | 1/2015 | Daboussi et al. | |
| 2016/0028283 A1* | 1/2016 | Chankaya | H02K 1/32 310/54 |
| 2017/0244298 A1 | 8/2017 | Hanumalagutti et al. | |
| 2018/0323683 A1* | 11/2018 | Stieger | H02K 3/24 |
| 2022/0416613 A1* | 12/2022 | Goykhman | H02K 21/24 |

* cited by examiner

US 12,273,016 B2

HIGH TORQUE DENSITY ELECTRIC MACHINE WITH DIRECTLY COOLED END WINDINGS

CROSS-REFERENCE TO RELATED APPLICATIONS

This application claims priority to, and incorporates by reference the entire disclosure of U.S. Provisional Patent Application No. 63/024,652, filed on May 14, 2020.

TECHNICAL FIELD

The present disclosure relates generally to electric machines and more particularly, but not by way of limitation to electric machines having windings wrapped around the stator teeth and having end turns that are cooled.

BACKGROUND

This section provides background information to facilitate a better understanding of the various aspects of the disclosure. It should be understood that the statements in this section of this document are to be read in this light, and not as admissions of prior art.

A few technologies are available that are employed to cool electric machines. First, some machines are equipped with a water jacket on the outside of the machine to remove heat. Second, the entire machine or some portion of the machine may be flooded with coolant, which is pumped through the machine to remove heat. Third, coolant may be pumped through the stator slots of an electric machine, either between the windings or inside hollow conductors, to remove heat directly from the windings.

SUMMARY

Aspects of the disclosure relate to a heat dissipation system. The heat dissipation system includes an electric motor that includes a stator. The stator includes a plurality of stator teeth. A thermal management system includes a first heat exchanger and a second heat exchanger. The first heat exchanger is formed into a plurality of microchannels that are thermally exposed to each stator tooth of the plurality of stator teeth. A heat-transfer fluid is disposed in the thermal management system. A pump is fluidly coupled to the first heat exchanger and the second heat exchanger for circulating the heat-transfer fluid.

Aspects of the disclosure relate to an electric machine. The electric machine includes a stator having a plurality of stator teeth. Each stator tooth or winding of the plurality of stator teeth includes a winding disposed there around. Each stator tooth of the plurality of stator teeth is shaped to receive a plurality of microchannels. The microchannels contain a circulating heat-transfer fluid; Each stator tooth or winding of the plurality of stator teeth is thermally exposed to the heat-transfer fluid via the plurality of microchannels so as to effectuate heat removal from each stator tooth of the plurality of stator teeth.

Aspects of the disclosure relate to a transformer. The transformer includes a core having a plurality of end windings. A thermal management system is thermally exposed to the plurality of end windings such that the plurality of end windings are directly cooled.

This summary is provided to introduce a selection of concepts that are further described below in the Detailed Description. This summary is not intended to identify key or essential features of the claimed subject matter, nor is it to be used as an aid in limiting the scope of the claimed subject matter.

BRIEF DESCRIPTION OF THE DRAWINGS

A more complete understanding of the subject matter of the present disclosure may be obtained by reference to the following Detailed Description when taken in conjunction with the accompanying Drawings wherein.

DETAILED DESCRIPTION

It is to be understood that the following disclosure provides many different embodiments, or examples, for implementing different features of various embodiments. Specific examples of components and arrangements are described below to simplify the disclosure. These are, of course, merely examples and are not intended to be limiting. The section headings used herein are for organizational purposes and are not to be construed as limiting the subject matter described.

A conventional goal for machine design is to minimize the size of the end windings in an effort to reduce costs and losses. However, the electric machine disclosed herein employs the end windings as a heat sink to remove heat from the stator. The electric machine involves a stator, which has electrically conductive windings. Additionally, in various embodiments, a coolant may be employed to interface with the end turns of the windings to remove heat from the stator. In various embodiments, the electric machine can be used to create motors or generators with extremely high torque densities or transformers. These electric machines could, in various embodiments, be used in a wide range of applications from electric motors in aircraft or electric vehicles to wind turbine generators. In various embodiments, the use of bar windings, instead of conventional round wires, could provide more flexibility for different end winding shapes that could facilitate more effective cooling.

Figure 1:
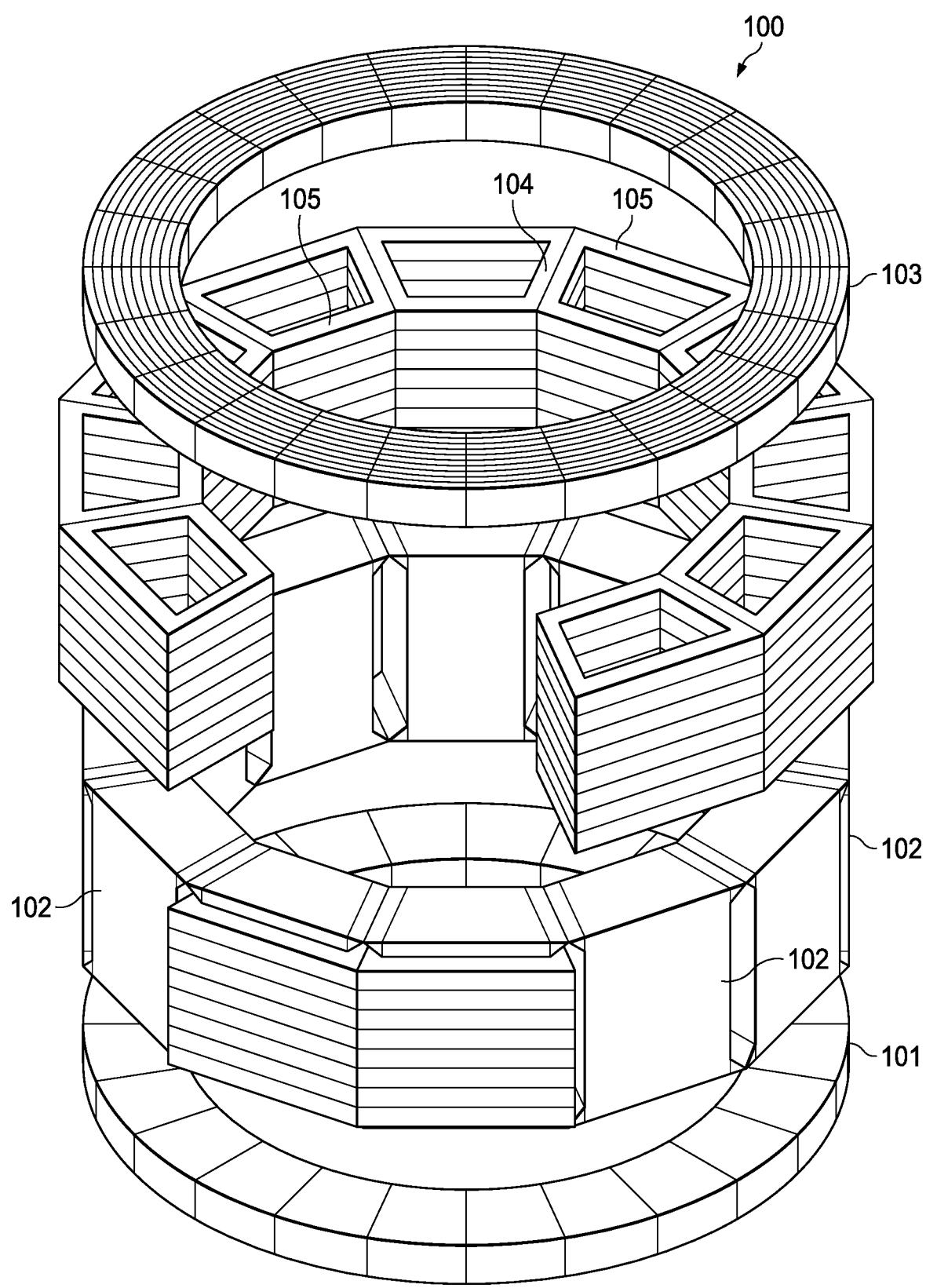
FIG. 1 is an exploded view of an electric machine according to aspects of the disclosure.

FIG. 1 is an exploded view of an electric machine 100. The electric machine 100 includes a plurality of ferromagnetic stator teeth 102. Each stator tooth 102 is surrounded by an electrically conductive winding 104. The electrically conductive windings 104 include end windings 105. The end windings 105 are disposed on radial ends of each stator tooth of the plurality of stator teeth 102. A first plurality of permanent magnets 101 and a second plurality of permanent magnets 103 bound the plurality of stator teeth 102 in an axial direction. By way of example, the electric machine 100 is illustrated in FIG. 1A as an axial flux machine. In other embodiments, aspects of the disclosure could also be applied to radial flux machines. In such embodiments, the first plurality of magnets 101 and the second plurality of magnets 103 bound the plurality of stator teeth 102 in the radial direction and the end windings 105 cross the axial faces of each stator tooth of the plurality of stator teeth 102. Still other embodiments, may include the first plurality of permanent magnets 101 and omit the second plurality of permanent magnets 103. In other embodiments, aspects of the disclosure may be applied to transverse flux machines.

Figure 2:
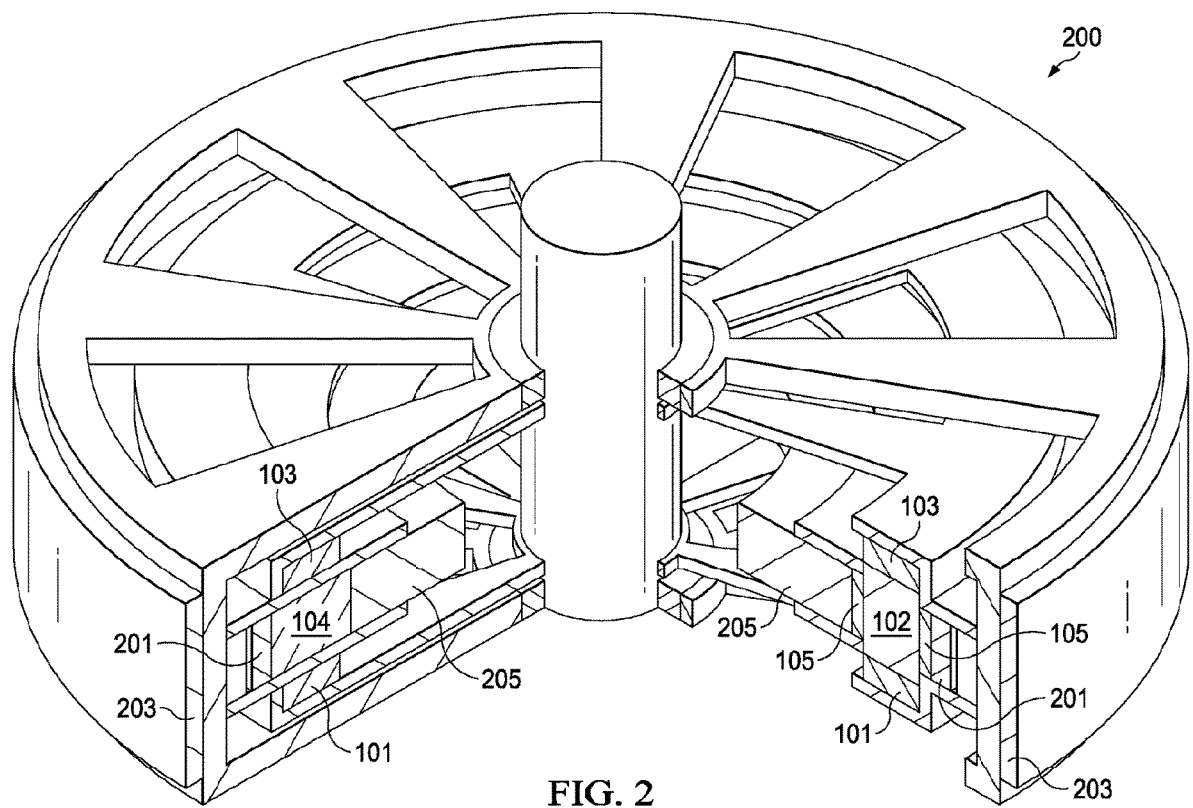
FIG. 2 is a cross-sectional view of an axial flux electric machine according to aspects of the disclosure.

FIG. 2 is a cross-sectional view of an axial flux electric machine 200. The axial flux electric machine 200 includes the plurality of stator teeth 102 that are surrounded by electrically conductive windings 104. End windings 105 are disposed across the inner and outer radial faces of each stator tooth of the plurality of stator teeth 102. The plurality of stator teeth 102 are bounded in the axial direction by the first plurality of permanent magnets 101 and the second plurality of permanent magnets 103. On the radially outside end winding 105, a heat sink 201 is mounted in thermal contact with the end windings 105. In various embodiments, the heat sink 201 includes a plurality of microchannels with a heat-transfer fluid pumped there through. During operation, the heat sink 201 receives heat from the end windings 105 via the microchannels and expels heat via two-phase flow through a condenser 203. In other embodiments, the heat may be expelled via single-phase flow through a radiator (not shown). As will be discussed in more detail below, in various embodiments, the plurality of microchannels may be formed integrally with the end windings 105; however, in other embodiments, the heat sink 201 including the microchannels may be added to the end windings 105 as a separate component. On the radially inside end windings 105, a thermal energy storage material 205 such as, for example, an adsorbent, such as, for example, zeolites is disposed that removes heat from the end windings 105 during high power transients. In various embodiments, the thermal energy storage material 205 is an external component that is mounted onto the end windings 105. In other embodiments, the heat sink 201 could be, for example, on the radial inside of the plurality of stator teeth 102 or the thermal energy storage material 205 could be on the radial outside of the plurality of stator teeth 102. In other embodiments, the heat sink 201 may be disposed on both the radial interior and the radial exterior end windings 105. In still other embodiments, the thermal energy storage material may be disposed on both the radial interior and the radial exterior end windings 105.

Figure 3A:
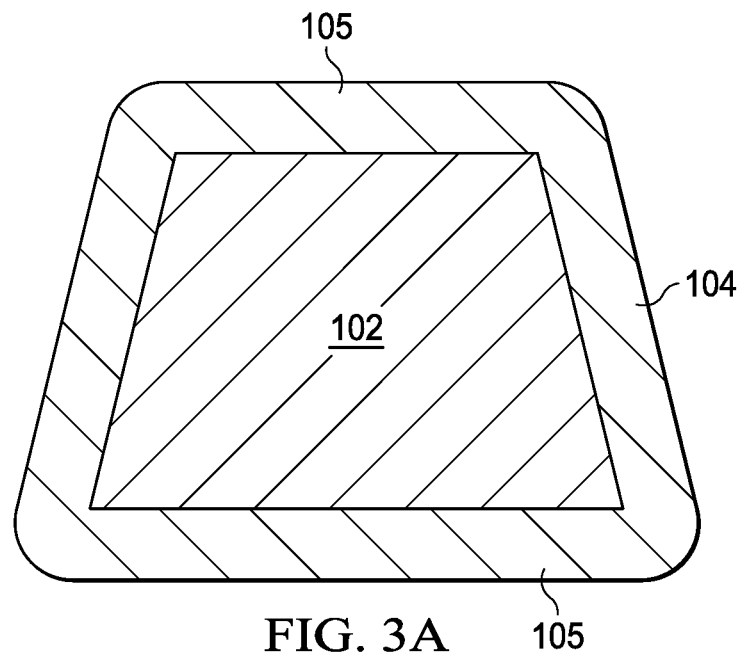
FIG. 3A is a cross-section of a stator tooth of a conventional axial flux motor according to aspects of the disclosure.
Figure 3B:
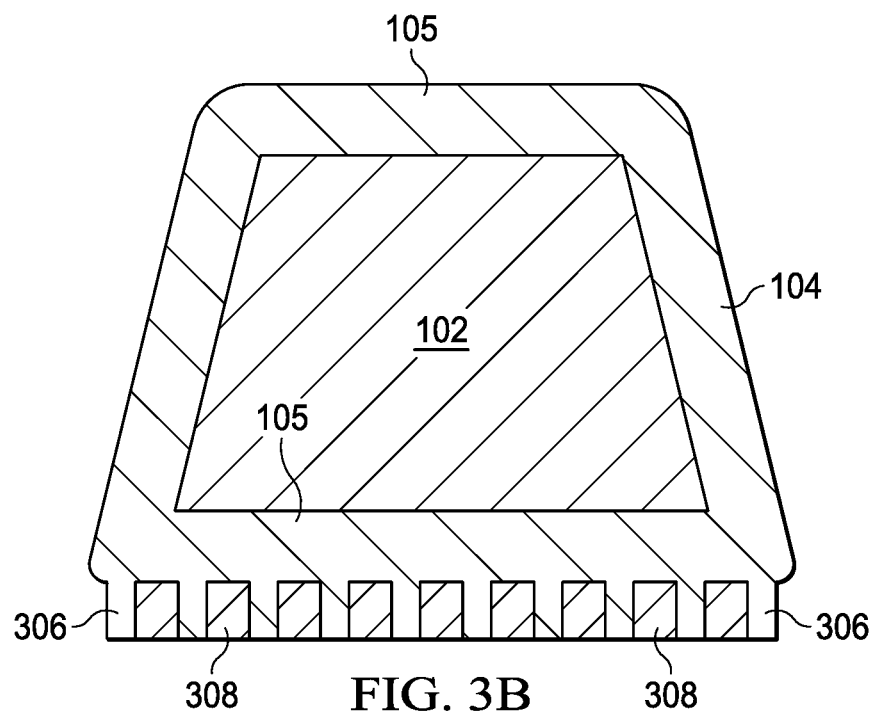
FIG. 3B is a cross-section of a stator tooth of an axial flux motor where the end windings have been shaped to have fins between which there are channels containing pumped coolant according to aspects of the disclosure.
Figure 3C:
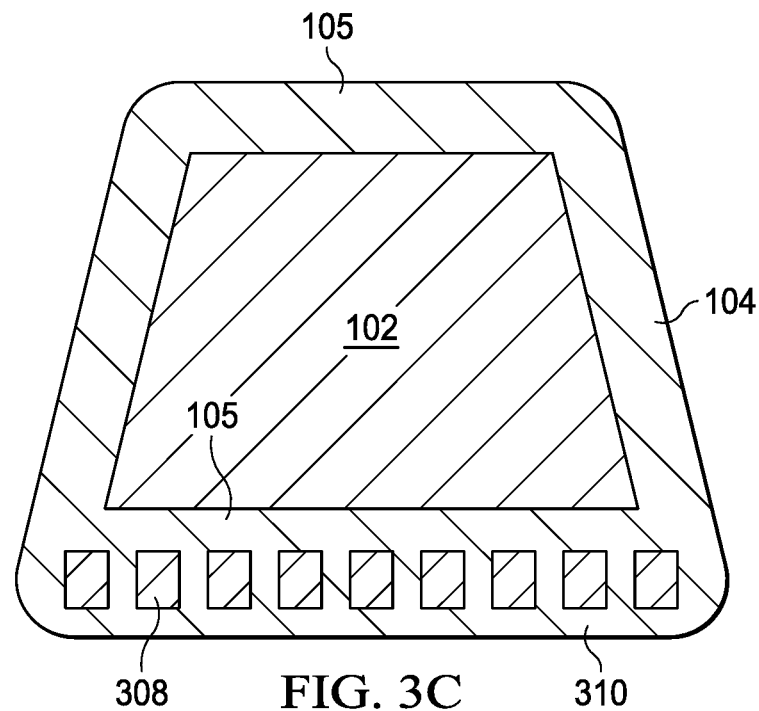
FIG. 3C is a cross-section of a stator tooth of an axial flux motor where the end windings have been shaped with holes for channels containing pumped coolant according to aspects of the disclosure.

FIG. 3A is a cross-section of the stator tooth 102 and windings 104. As illustrated in FIG. 3A, the stator tooth 102 is surrounded by the electrically conductive winding 104 with end windings 105 disposed over radial ends of the stator tooth 102. FIG. 3B is a cross-section of the stator tooth 102 of an axial flux motor where the end windings 104 have been shaped to have fins 306. Between the fins 306, channels 308 are disposed containing a heat-transfer fluid. The fins 306 facilitate increased surface area of the end windings 105 and provide thermal exposure to the heat-transfer fluid. FIG. 3C is a cross-section of a stator tooth 102 of an axial flux motor where the end windings 105 have been shaped with apertures 310. Channels 308 containing the pumped heat-transfer fluid are disposed within the apertures 310. The apertures 310 facilitate increase surface area of the end windings 105 and provides thermal exposure to the heat-transfer fluid contained in the channels 308. In various embodiments, the heat-transfer fluid may be pumped to effectuate heat transfer. In other embodiments, passive heat transfer, utilizing an unpumped heat-transfer fluid, could be employed.

Figure 4B:
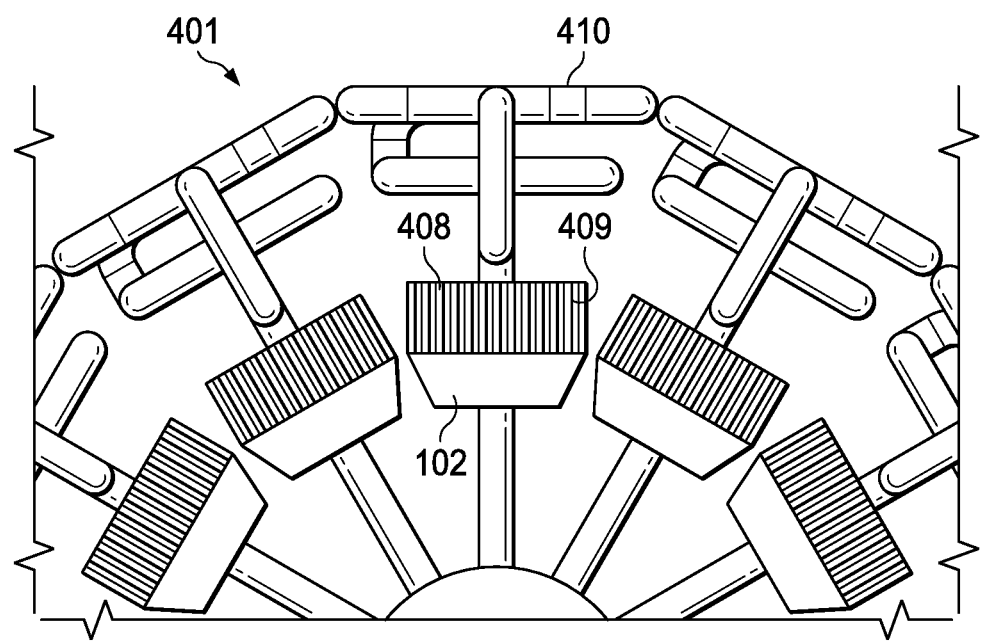
FIG. 4B is a diagram of stator teeth and a second heat exchanger according to aspects of the disclosure.
Figure 4A:
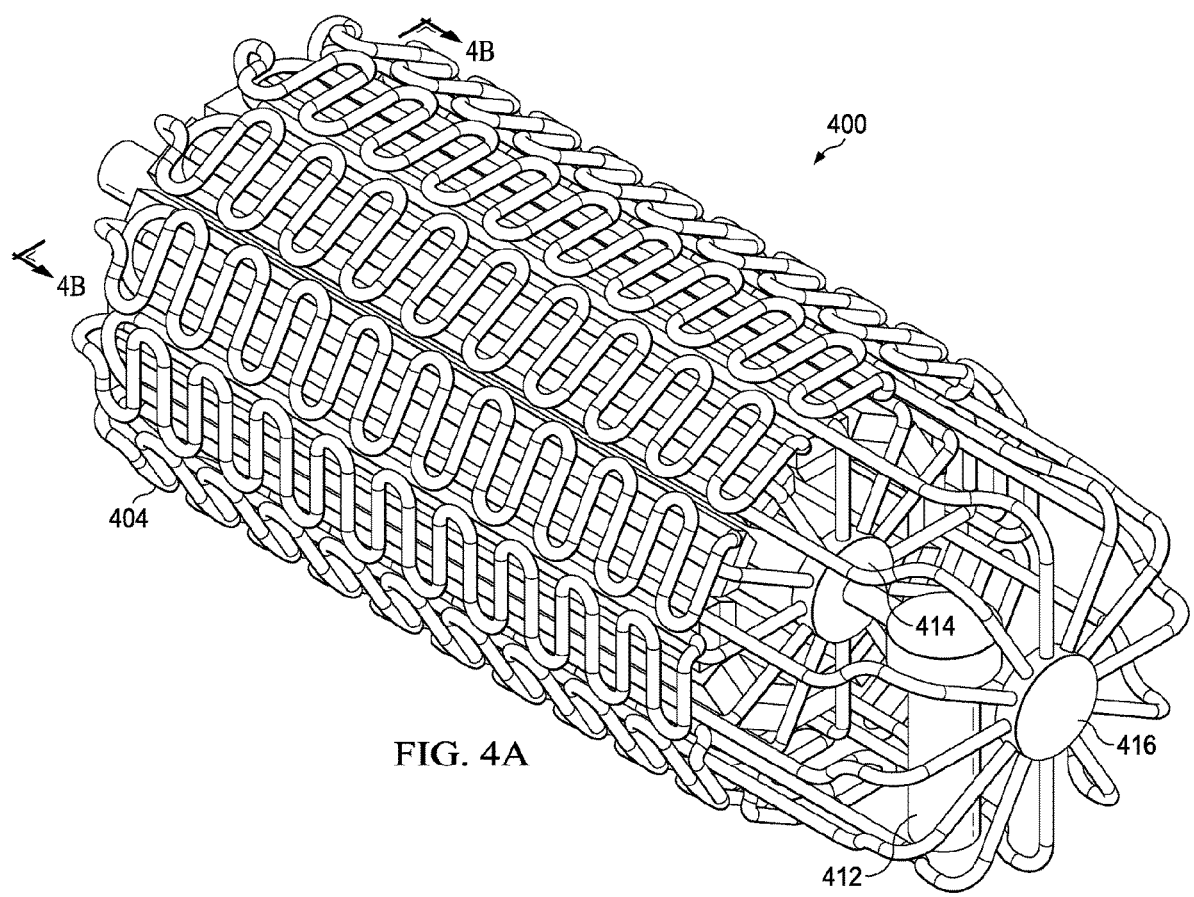
FIG. 4A is a diagram of an electric motor having liquid-cooled stator teeth according to aspects of the disclosure.

FIG. 4A is a diagram of an electric motor 400 having the liquid-cooled stator teeth 102. FIG. 4B is a diagram of the stator teeth 102 and a second heat exchanger 410. The electric motor 400 includes a stator 401 having the plurality of stator teeth 102. Each stator tooth of the plurality of stator teeth 102 is encircled by the electrically-conductive windings 104 (not explicitly shown in FIGS. 4A-4B). In various embodiments, the electric motor 400 is, for example, an axial flux permanent motor with two rotors and a single yokeless and segmented stator; however, in other embodiments, other types of motors could be utilized. In various embodiments, a five-level Gallium Nitride (GaN) inverter is used to drive the electric motor 400; however, in other embodiments, other types of motor drives could be utilized including, for example, radial flux motors as well as motors having a single rotor or multiple rotors. In various embodiments, the GaN inverter enables higher efficiencies and operating temperatures. For example, in various embodiments, the GaN inverter enables operating efficiencies up to approximately 99% and operating junction temperature up to approximately 150° C. In various embodiments, a multilevel inverter can supply voltages with lower total harmonic distortion (THD), reducing losses in the electric motor 400.

In various embodiments, the axial flux permanent magnet motor 400 employs grain-oriented electrical steel, which has significantly better performance in the direction of the grain compared to non-oriented electrical steel. In other embodiments, other materials could be utilized. In various embodiments, the axial flux permanent magnet motor 400 uses segmented high-strength rare earth magnets, tooth tips, and rectangular wires. In other embodiments, other materials could be utilized. The axial flux topology places the end windings 105 at the outer diameter of the motor. In various embodiments, the end windings 105 are exposed to a thermal management system 404 to dissipate heat from the end windings 105. In various embodiments, such an arrangement allows for a higher power density of the electric motor 400.

The thermal management system 404 surrounds the stator 401 absorbs and rejects heat generated by the electric motor 400. The thermal management system 404 includes a pump 412, a plurality of first heat exchangers 408, which are thermally exposed to the plurality of stator teeth 102, and a plurality of second heat exchangers 410, which are fluidly coupled to the plurality of first heat exchangers 408 and are thermally exposed to an ambient environment. The first heat exchangers 408 are formed into a plurality of microchannels 409. The plurality of microchannels 409 are thermally exposed to each stator tooth of the plurality of stator teeth 102 and facilitate heat transfer from the plurality of stator teeth 102. In various embodiments, the plurality of microchannels 409 may be disposed between the fins 306 shown in FIG. 3B or within the apertures 310 shown in FIG. 3C. In various embodiments, a heat-transfer fluid such as, for example ethanol, glycol, water, or any other heat-transfer fluid, is disposed within the plurality of first heat exchangers 408 and the plurality of second heat exchangers 410. A pump 412 circulates the heat transfer fluid through the plurality of first heat exchangers 408 and the plurality of second heat exchangers 410. A first manifold 414 is fluidly coupled to the pump 412 and fluidly coupled to the plurality of first heat exchangers 408 and a second manifold 416 is fluidly coupled to the pump and fluidly coupled to the plurality of second heat exchangers 410. During operation, the first manifold 414 and the second manifold 416 facilitate distribution of the heat transfer fluid to the plurality of first heat exchangers 408 and the plurality of second heat exchangers 410. Additionally, the first manifold 414 and the second manifold 416 accommodate variations in pressure of the heat transfer fluid.

Still referring to FIGS. 4A and 4B, in various embodiments, the thermal management system 404 employs two-phase cooling to reject heat from the electric motor 400 and inverter to the ambient environment. During operation, the heat-transfer fluid is vaporized in the microchannels 409 of the first heat exchangers 408 by heat absorbed from the plurality of stator teeth 102. The heat-transfer fluid is then condensed in the second heat exchangers 410, thereby rejecting the absorbed heat to an ambient environment. In such embodiments, the first heat exchangers 408 operate as evaporator coils and the second heat exchangers 410 operate as condenser coils. In other embodiments, the thermal management system employs single-phase cooling to reject heat from the electric motor 400. In such embodiments, the heat-transfer fluid absorbs heat from the windings in the first heat exchangers 408 and discharges heat to the ambient environment in the second heat exchangers 410; however, the heat-transfer fluid does not undergo a phase change. In various embodiments, the ambient environment may be, for example, air flow from a propulsor (not specifically shown). The heat-transfer fluid such as, for example, ethanol, is pumped directly through the plurality of first heat exchangers 408 and the plurality of second heat exchangers 410. The plurality of first heat exchangers 408 are thermally exposed to the end windings 105 on the stator 401 to reject heat from the end windings 105. In various embodiments, another heat-transfer fluid, such as for example, water, glycol, or ethanol may be utilized.

Figure 5A:
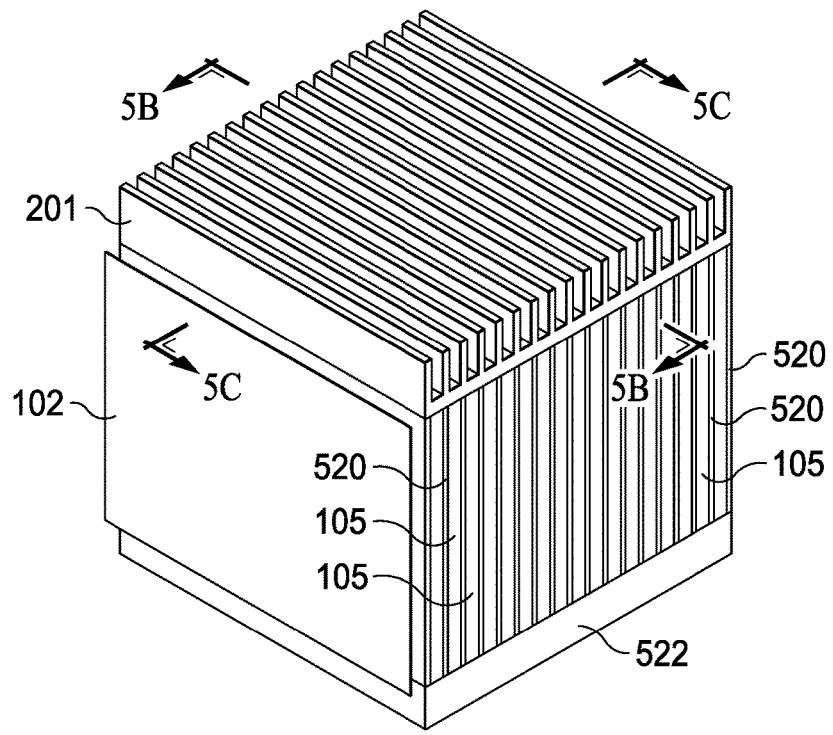
FIG. 5A is a diagram of a stator tooth illustrating cooling microchannels on end turns thereof, high-thermal-conductivity dielectric coating, and thermal energy storage material for transient desorption cooling according to aspects of the disclosure.

FIG. 5A is a diagram of a stator tooth 102 illustrating cooling microchannels 218 on end windings thereof, high-thermal-conductivity insulation 520, and thermal energy storage material 522 for transient cooling such as, for example, a phase-change adsorbent. The thermal energy storage material 522 absorbs high power thermal transients via desorption of water, allowing for significant reduction in mass of the thermal management system 404. In various embodiments, the thermal energy storage material 522 may be, for example, microporous aluminosilicate adsorbents such as, for example, zeolite. In various embodiments, other phase-change materials may be utilized to remove thermal energy from the stator tooth 102. Such an arrangement minimizes core losses in the electric motor 400, maximizes copper fill factor, and facilitates extraction of heat from the end windings 105. In various embodiments, the high-thermal-conductivity insulation 520 is disposed between individual end windings 105 and is a dielectric coating. In various embodiments, the insulation 520 is formed, for example, using layer by layer deposition of nanocomposite coatings. Such embodiments exhibit a thermal conductivity two orders of magnitude larger than the state-of-the-art. In various embodiments, carbon fiber, for example, composites may be used to minimize the structural mass of the electric motor 400. In various embodiments, the high-thermal conductivity electrical insulation 520 of copper windings using layer-by-layer deposited nanocomposite films based on nanoparticles, such as hexagonal (hBN) and cubic (cBN) boron nitride increases the thermal conductivity of the insulation 520. The high-thermal conductivity insulation 520 is deposited using, for example a scalable process. Periods of high power requirements require a transient thermal management solution to prevent the need to oversize the electric motor 400. In such embodiments, the thermal energy storage material 522 may be incorporated into the stator design to allow for evaporative cooling during periods of extreme power requirements, and will be designed to optimize both energy and cooling power density. In various embodiments, the thermal energy storage material 522 may be, for example, microporous aluminosilicate adsorbents such as, for example, zeolite The thermal energy storage material 522 will recharge during lower-power conditions, when the thermal management system 404 is capable of dissipating the resulting heat of adsorption.

Figure 5B:
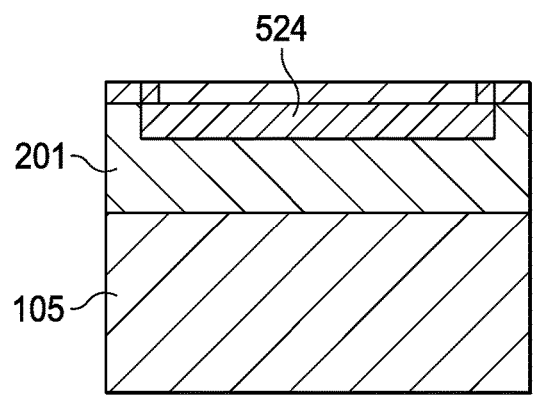
FIG. 5B is a cross-sectional view, taken along line 5B-5B, of the stator tooth of FIG. 5A according to aspects of the disclosure.
Figure 5C:
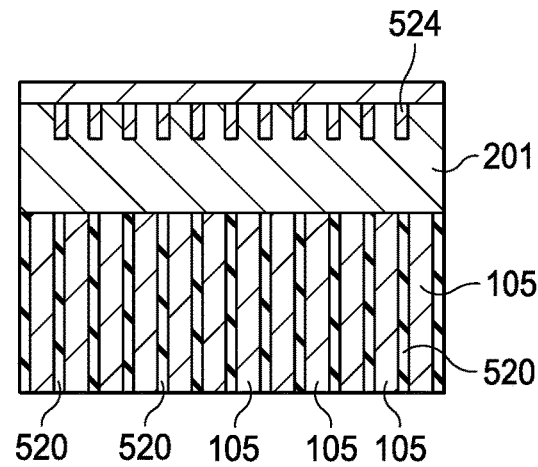
FIG. 5C is a cross-sectional view, taken along line 5C-5C, of the stator tooth of FIG. 5A according to aspects of the disclosure.

FIG. 5B is a cross sectional view of a heat sink 210 taken along line 5B-5B of FIG. 5A. FIG. 5C is a cross sectional view of the heat sink 210 taken along line 5C-5C of FIG. 5A. The heat sink 201 is positioned radially of, and thermally exposed to, the end windings 105. As shown in FIG. 5C, the high-thermal-conductivity insulation 520 is positioned between individual windings of the end windings 105. Channels 524 are formed in the heat sink 201 for circulation of a heat-transfer fluid there through. During operation, heat is rejected from the end windings 105 through the heat sink 201 and into the heat-transfer fluid. The heat-transfer fluid is then used to reject the heat to the ambient environment via, for example, single-phase or multi-phase fluid flow.

Figure 6:
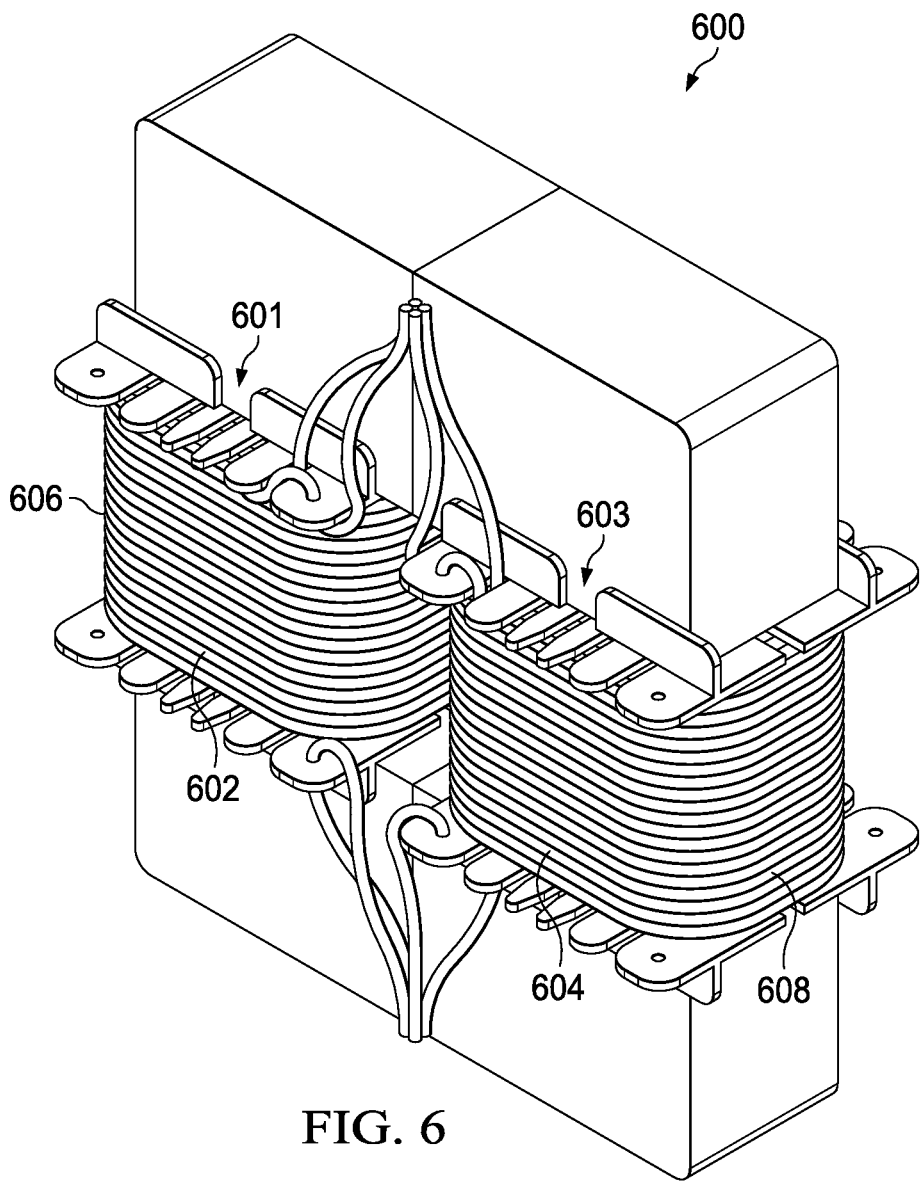
FIG. 6 is a schematic diagram of a transformer according to aspects of the disclosure.

FIG. 6 is a schematic diagram of a transformer 600. The transformer 600 includes a first core 601 that is surrounded by a first winding 602 and a second core 603 that is surrounded by a second winding 604. The first winding 602 is electromagnetically exposed to the second winding 604. A first end winding 606 is a portion of the first winding 602 that is oriented opposite the first core 601. A second end winding 608 is a portion of the second winding 604 that is oriented opposite the second core 603. In various embodiments, aspects of the disclosure could be utilized to remove heat from the first end winding 606 and the second end winding 608. For example, the first end winding 606 and the second end winding 608 could be formed into fins or channels similar to those illustrated and discussed in FIGS. 3B-3C. In other embodiments, a thermal management system such as, for example, the thermal management system 404 illustrated and discussed in FIGS. 4A-4B, could be utilized to provide liquid cooling to the first end winding 606 and the second end winding 608. In still other embodiments, a heat storage material such as, for example, the thermal energy storage material 522, could be utilized to remove heat from the first end winding 606 and the second end winding 608. The embodiments described hereinabove could be utilized singularly or in combination. In other embodiments, the transformer 600 could include additional cores and additional windings. In such embodiments, each of the windings could be cooled via the end windings according to various aspects of the disclosure.

Relative to a water jacket, designing the end windings for direct cooling facilitates a more effective removal of heat because this reduces the thermal resistance between the windings and the coolant.

Relative to coolant flooded machines, designing the end windings for direct cooling provides a more precisely targeted cooling strategy. This allows the machine designer to have fewer hot spots in the machine and to more directly cool the windings, which are the primary heat source. Additionally, less coolant can be used, which reduces the overall weight of the system. Furthermore, the elimination of coolant in the air gap can reduce the drag losses on the rotor.

Relative to running coolant in the stator slots, designing the end windings for direct cooling has the advantage of not reducing the amount of copper in the slots. To maximize torque density, it is important to maximize the current in the slots. Running coolant through the slots allows the copper to have a higher current density but it also reduces the overall cross-sectional area available for copper in the slots, which is counterproductive towards increasing the current in the slots. Directly cooling the end windings allows the copper to have a higher current density without reducing the overall cross-sectional area available for copper in the slots.

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an," and other singular terms are intended to include the plural forms thereof unless specifically excluded.

What is claimed is:

1. A heat dissipation system, comprising:
    an electric motor comprising a stator, the stator comprising a plurality of stator teeth, each stator tooth of the plurality of stator teeth having conductors wrapped there around;
    a thermal management system comprising a first heat exchanger and a second heat exchanger, the first heat exchanger being formed into a plurality of microchannels that are thermally exposed to the conductors wrapped around each stator tooth of the plurality of stator teeth;
    a heat-transfer fluid disposed in the thermal management system; and
    a pump fluidly coupled to the first heat exchanger and the second heat exchanger for circulating the heat-transfer fluid; and
    a plurality of channels formed on a surface of the conductors wrapped around a stator tooth of the plurality of stator teeth, wherein a microchannel of the plurality of microchannels is disposed in each channel of the plurality of channels.

2. The heat dissipation system of claim 1, comprising a high thermal conductivity dielectric coating applied to each stator tooth of the plurality of stator teeth.

3. The heat dissipation system of claim 1, comprising a thermal energy storage material coupled to the conductors wrapped around each stator tooth of the plurality of stator teeth.

4. The heat dissipation system of claim 1, wherein the heat-transfer fluid is ethanol.

5. The heat dissipation system of claim 1, further comprising a first manifold fluidly coupled to the pump and to the first heat exchanger.

6. The heat dissipation system of claim 5, wherein the first heat exchanger comprises a plurality of first heat exchangers that are coupled to the first manifold in parallel.

7. The heat dissipation system of claim 1, further comprising a second manifold fluidly coupled to the pump and to the second heat exchanger.

8. The heat dissipation system of claim 7, wherein the second heat exchanger comprises a plurality of second heat exchangers that are coupled to the second manifold in parallel.

9. The heat dissipation system of claim 1, wherein the thermal management system employs two-phase cooling to reject heat from the electric motor to the ambient environment.

10. The heat dissipation system of claim 9, wherein the thermal management system is configured so that the heat-transfer fluid is vaporized in the first heat exchanger by heat absorbed from the plurality of stator teeth and condensed in the second heat exchanger to reject the absorbed heat to the ambient environment.

11. The heat dissipation system of claim 1, wherein the thermal management system employs single-phase cooling to reject heat from the electric motor to the ambient environment.

12. The heat dissipation system of claim 11, wherein the thermal management system is configured so that the heat-transfer fluid adsorbs heat from the first heat exchanger and discharges heat to the ambient environment via the second heat exchanger.

13. The heat dissipation system of claim 1, wherein the second heat exchanger is positioned radially outward of the first heat exchanger.

* * * * *